No. 887,603. PATENTED MAY 12, 1908.
C. DORN.
LUBRICATOR.
APPLICATION FILED AUG. 5, 1907.
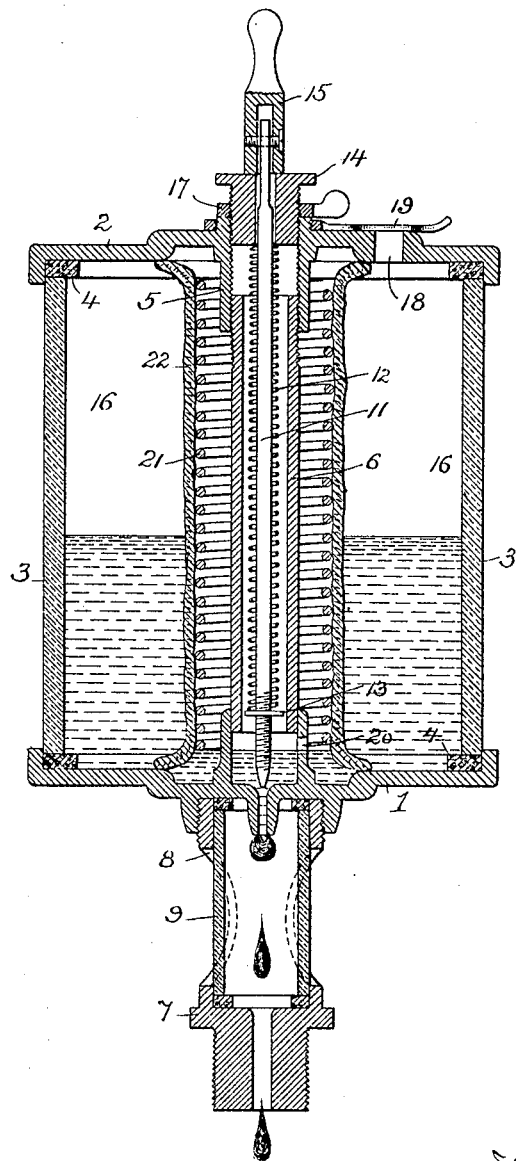
Witnesses
Hamilton T. Turner
Kate A. Beadle
Inventor
Christian Dorn
by his Attorneys
Smith & Frazier

UNITED STATES PATENT OFFICE.

CHRISTIAN DORN, OF PHILADELPHIA, PENNSYLVANIA.

LUBRICATOR.

No. 887,603.  Specification of Letters Patent.  Patented May 12, 1908.

Application filed August 5, 1907. Serial No. 387,157

*To all whom it may concern:*

Be it known that I, CHRISTIAN DORN, a citizen of the United States, residing in Philadelphia, Pennsylvania, have invented certain Improvements in Lubricators, of which the following is a specification.

The object of my invention is to provide simple and efficient means for preventing the access of gummy oil, sediment, or other foreign matter to the bearing or other part which is being lubricated; to readily stop the flow of oil to the bearing when desired, and to accurately control or regulate such flow when the lubricator is in use. This object I attain in the following manner, reference being had to the accompanying drawing, which illustrates a longitudinal vertical section of an oil cup or lubricator constructed in accordance with my invention.

In the drawing, 1 indicates the base of the lubricator, 2 the top of the same, and 3 the cylindrical body, which is preferably of glass or other transparent material and bears at its opposite ends upon packing rings 4, of cork or other suitable material, carried, respectively, by the base and by the cap or cover of the lubricator, these parts being firmly secured together by reason of the engagement of the internally threaded lower end of a tubular boss 5 on the cap with the externally threaded upper end of a tubular stem 6 projecting upwardly from the base 1. As shown in the drawing, the tube 6 comprises upper and lower members secured together, the lower member consisting of a tubular projection on the base, but this is not essential. To said base 1 of the lubricator is secured a depending stem 7 threaded at the lower end for being screwed into the bearing or other part to be lubricated, this stem having openings 8 on opposite sides and being provided with a tube 9 of glass, or other transparent material, whereby the oil escaping from the lubricator is visible in its passage through the tube 9, thus constituting a sight feed.

The lower member of the tubular stem 6 has a seat for the lower end of a valve stem 11 which is centrally disposed within the said stem 6 and is normally depressed by a coiled spring 12 interposed between a pin, collar, or other projection 13 on the valve stem, and the inner end of a threaded regulating plug 14, the latter being screwed into the internally threaded opening of the boss 5 and being locked in position after any desired adjustment by means of a lock nut 17 bearing upon the upper end of said boss 5.

Pivoted to the upper end of the valve stem 11 is a slotted lever 15 which, when raised to the vertical position shown in the drawing, bears upon the head of the regulating plug 14 and lifts the valve stem so as to raise the valve from its seat, as shown, the turning of the lever 15 to a horizontal position permitting the spring 12 to depress the valve stem so as to close the valve against its seat and thus cut off any escape of oil from the lubricator. The adjustment of the plug 14 provides for any desired amount of lift of the valve when the lever 15 is adjusted to the vertical position, accurate control of the flow of oil from the regulator, when the valve is open, being thereby provided for.

In the cap 2 of the regulator casing is an opening 18 through which a fresh supply of oil can be introduced into the oil reservoir 16, this opening being normally closed by a swinging cap or cover 19 which is pivotally mounted upon the upwardly projecting portion of the boss 5.

The lower member of the stem 6 has, adjacent to the bottom plate of the lubricator casing, an opening 20, and surrounding the stem and extending from the top to the bottom plate of the casing is a coiled spring 21, which is of larger diameter than the stem 6, in order to provide an oil space or chamber surrounding the latter. This coiled spring 21 serves as a support and distender for a tubular wick 22, or other mass of fibrous material, which likewise extends, by preference, from top to bottom of the lubricator casing, although it may extend only part way from the bottom towards the top so long as the level of oil in the reservoir 16 of the lubricator is not carried above the top of the wick. The latter thus serves as a filter for the oil, which, after passing through the wick, lodges upon the spiral rib formed by the convolutions of the spring 21 which thus directs the filtered oil to the bottom of the chamber surrounding the stem 6, from which it passes through the opening 20 into the valve-controlled passage within the stem.

Owing to its capillary attraction the wick 22 will be saturated with oil throughout its entire extent so long as any oil remains in the reservoir 16, and an extended filtering body is thus presented at all times, whether the amount of oil in the outer oil chamber is great or small.

By preference the tubular wick 22 fits so snugly to the coiled spring 21 as to slightly contract the same, whereby the wick is held constantly distended under a slight pressure, and the delivery of oil from the wick to the spiral rib presented by the coiled spring is thereby facilitated.

I claim:—

1. A lubricator having an oil reservoir, a discharge passage for the oil, a tubular filtering body surrounding said discharge passage, and a spiral directing rib disposed on the inner side of the said tubular filtering body.

2. A lubricator having an oil reservoir, a discharge passage for the oil, a tubular filtering body surrounding said discharge passage, and a coiled spring disposed on the inner side of said tubular filtering body and in contact therewith.

3. A lubricator having an oil reservoir, a discharge passage for the oil, a tubular filtering body surrounding said discharge passage, and a coiled spring disposed on the inner side of the said tubular filtering body and exercising a distending effect thereupon.

4. A lubricator having a casing comprising a top, a bottom and an interposed member inclosing an oil reservoir, a discharge passage for the oil, a tubular filtering body surrounding said passage and extending from top to bottom of the casing and in contact with each, and a spiral rib disposed on the inner side of said tubular filtering body.

5. A lubricator having a casing comprising a top, a bottom, and an interposed member inclosing an oil reservoir, a discharge passage, a tubular filtering body surrounding said passage and extending from top to bottom of the casing and in contact with each, and a coiled spring disposed within said tubular filtering body and in contact with the inner face of the same, said spring also extending from top to bottom of the lubricator casing.

6. A lubricator consisting of a casing having a top, a bottom and an interposed member inclosing an oil reservoir, tubular engaging members on said top and bottom containing a discharge passage for the oil, a tubular filtering body surrounding said discharge passage a spiral rib disposed on the inner side of said filtering body, and a communication between the discharge passage and the chamber between the same and the filtering body.

In testimony whereof, I have signed my name to this specification, in the presence of two subscribing witnesses.

CHRISTIAN DORN.

Witnesses:
HAMILTON D. TURNER,
KATE A. BEADLE.